US006166741A

United States Patent [19]

Hemingway

[11] Patent Number: 6,166,741

[45] **Date of Patent: *Dec. 26, 2000**

[54] GRAPHICS SEGMENT ORGANIZATION IN A GRAPHICS SYSTEM

[75] Inventor: Peter Hemingway, Bristol, United Kingdom

[73] Assignee: Hewlett Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/211,497

[22] PCT Filed: Oct. 10, 1991

[86] PCT No.: PCT/GB91/01765

§ 371 Date: Apr. 7, 1994

§ 102(e) Date: Apr. 7, 1994

[87] PCT Pub. No.: WO93/07582

PCT Pub. Date: Apr. 15, 1993

[51] Int. Cl.[7] .......... G06T 15/10

[52] U.S. Cl. .......... 345/420

[58] Field of Search .......... 395/120, 121, 395/122; 345/420–422

[56] References Cited

U.S. PATENT DOCUMENTS

| | | | |
|---|---|---|---|
| 4,811,245 | 3/1989 | Bunker et al. | 345/429 |
| 4,862,392 | 8/1989 | Steiner | 345/427 |
| 4,928,250 | 5/1990 | Greenberg et al. | 345/426 |
| 4,967,375 | 10/1990 | Pelham et al. | 345/515 |
| 5,058,042 | 10/1991 | Hanna et al. | 345/427 |
| 5,115,402 | 5/1992 | Matsushiro et al. | 345/441 |
| 5,185,599 | 2/1993 | Doornick et al. | 345/516 |
| 5,528,744 | 6/1996 | Vaughton | 395/157 |
| 5,986,661 | 11/1999 | Hemingway | 345/421 |

FOREIGN PATENT DOCUMENTS 9 005 958 5/1990 WIPO .

OTHER PUBLICATIONS

IEEE Computer Graphics and Applications, Mar. 1988, New York, U.S., pp. 60–70, Glassner, "Spacetime Ray–Tracing for Animation".

IEEE Computer Graphics and Applications, Sep. 1986, New York, U.S., pp. 29–39, E.A. Rossignac, "Depth Buffering Display Techniques for Constructive Solid Geometry".

Newman et al., *Principles of Interactive Computer Graphics*, second edition, McGraw–Hill, pp. 229–273.

(List continued on next page.)

*Primary Examiner*—Mark K. Zimmerman
*Assistant Examiner*—Manorama Padmanabhan

[57] ABSTRACT

A graphics system is provided that utilizes a tree-structured organization of graphic segments (a-m) which potentially overlap when presented as a two-dimensional image. Each child segment in said organization inherits image-related spatial transformations to which its parent is subject. To increase flexibility of representation using such a tree organization, provision is made for associating parent and child segments (c;b,d) by an attachment relationship that determines that outside of the boundary of the parent (c) in said image, the child (b,d) is unrestricted by its parent. This relationship may either be an "above" or "below" attachment relationship (40,42) depending on whether the child or parent has a higher depth priority where the segments overlap. By employing attachment relationships (40,42), it becomes possible to build an image in which, for example, a "note" is clipped to a "report" using a "paperclip" with both the note and paperclip extending beyond and overwriting the report and the paperclip extending beyond and overwriting the note, all three elements moving/rotating/scaling as one when the report is moved/rotated/scaled. In this example, the note is a child of the report and is associated with the latter by an "above" attachment relationship; a similar relationship exists between the note and the paperclip.

11 Claims, 8 Drawing Sheets

OTHER PUBLICATIONS

Hemingway, doctoral thesis, *Computer Display Architecture*, Cambridge University Library, England, class mark PHD 150 76.

Gordon et al., "Image Space Shading of 3–Dimensional Objects", Computer Vision, Graphics and Image Processing, Academic Press:New York, 1985, vol. 29, No. 3, pp. 361–376.

Hau Xu et al., "Accelerated Radiosity Method for Complex Environments", European Computer Graphics Conference and Exhibition, 1989, pp. 51–61.

Foley et al., Computer Graphics: Principles and Practice, 2nd Ed, 1990, pp. 37, 55, 58–63, 71–72, 96–99; 124–125, 660–661, 664–665, 668–669, 680–689, 705–706, 897–898, 943–944.

Gordon et al., "Front–to–Back Display of BSP Trees", Sep. 1991, pp. 79–85.

Salmon, Rod and Slater, Mel, "Computer Graphics Systems and Concepts", Addison–Wesley: Wokingham, England, 1987, pp. 228–238.

SEGMENT
21P
PARENT

21S(2)
21S(1)
21A
34
39
28
SEGMENT IDENTITY
29
BOUNDARY
P - PARENT
39
30
FILL
P - SIBLING
35
31
TRANSFORM
P - CHILDREN
SIBLINGS
ABOVE
CONTAINED
BELOW
36
37
38
40
41
42
21C
21C
21C
CHILDREN
'ABOVE' SIBLING CHAIN 25
'CONTAINED' SIBLING CHAIN 26
'BELOW' SIBLING CHAIN 27

EDGE TABLE
CHAINED EDGE RECORDS
70
71
72
BOUNDARY
73
74
69
75
76
61
63

62
ACTIVE EDGE LIST
63
69

SPAN TABLE
60
65

GRAPHICS SEGMENT ORGANIZATION IN A GRAPHICS SYSTEM

This application is a 371 of PCT/GB91/01765 filed on Oct. 10, 1991.

TECHNICAL FIELD

The present invention relates to graphics systems which, in use, utilizes a hierarchical organization of graphic segments that potentially overlap when presented as a two-dimensional image.

BACKGROUND ART

It is well known to build up an internal representation of a two-dimensional image to be displayed, in terms of discrete graphic segments that potentially overlap in the image. Where these graphic segments are to be displayed as solid bodies, then it is necessary to determine which segment has priority in the event of overlap between two segments. This depth priority issue is generally handled by assigning differing priorities to the various segments and then resolving any overlap conflicts according to the assigned priorities of the segments concerned. The actual resolution process can be approached in a number of ways, the most well known of which embody the so-called "painters algorithm" in some form. In this algorithm, the image (or frequently, each successive image line) is built up from its component segments in reverse priority order so that higher priority segments overwrite lower priority ones; this approach whilst eminently feasible particularly where a display frame buffer is being used, does require considerable duplication of effort in terms of writing areas that are subsequently overwritten.

A general discussion of image construction from multiple segments and of the priority resolution issue, can be found in most standard textbooks on graphics systems such as "Principles of Interactive Computer Graphics" William M. Newman and Robert F Sproull, second edition, McGraw-Hill.

It is also known to provide a degree of association between graphic segments rather than treating each segment in isolation. In particular, it is known to associate segments in a windowing, or containment, relationship whereby one segment (the parent segment) contains one or more further segments (child segments), the latter being clipped to the boundary of the parent segment but overwriting the latter where they overlap. The parent segment thus acts as a window through which its children can be viewed. Generally, though not in all cases, the containment relationship is implemented in such a way that spatial transformations applied to the parent (that is, translation, rotation and scaling) are also experienced by any contained children.

One example of a graphics system in which the graphic segments are inter-related by containment relationships is the system described in the doctoral thesis of the present inventor (Doctoral Thesis, "Computer Display Architecture", Peter Hemingway, Cambridge University Library, England, class mark PHD 150 76). In this system, all graphic segments are organized into a tree structure with the parent-child relationship being a containment relationship. Although the parent-child containment relationship does partly define the relative priorities of the segments, this definition is not complete as the relative priorities of siblings (children of the same parent) must also be defined, this generally being done by the application causing generation of the tree. The containment relationships are implemented in this system such that children experience spatial transformations to which their parents are subject; in addition, each child is subject to a spatial transformation relative to its parent. As a result, the positioning, orientation and size of each segment (or segment portion) appearing in the final image is a concatenation of a chain of spatial transformations extending from the segment up through its ancestors to the root of the segment tree.

Although the graphics system described in the aforesaid thesis offers substantial flexibility, there are certain natural relationships that the system cannot readily represent. Accordingly, it is an object of the present invention to provide a graphics system, and in particular an organization of graphic segments, that permits increased flexibility of association between segments.

SUMMARY OF THE INVENTION

According to one aspect of the present invention, there is provided, in a graphics system, a hierarchical organization of graphic segments that potentially overlap when presented as a two-dimensional image, each child segment in said organization inheriting image-related spatial transformations to which its parent is subject, characterised in that said organization includes an attachment relationship between a child segment and its parent that determines that outside of the boundary of the parent in said image, the child is unrestricted by said parent.

Two types of attachment relationship are possible. Thus, with an "above" type of attachment relationship, the child has a higher depth priority than its parent resulting in its display on top of its parent in said image where the child and parent overlap. In contrast, with a "below" type of attachment relationship, the child has a lower depth priority than its parent resulting in its parent being displayed on top in said image where the child and parent overlap.

By employing an attachment relationship, it becomes possible to build an image in which, for example, a "note" is clipped to a "report" using a "paperclip" with both the note and paperclip extending beyond and overwriting the report and the paperclip extending beyond and overwriting the note, all three elements moving rotating/scaling as one when the report is moved/rotated/scaled. In this example, the note is a child of the report and is associated with the latter by an "above" attachment relationship; a similar relationship exists between the note and the paperclip.

In another aspect, the present invention contemplates a graphics output system comprising organizing means for organizing into a hierarchical organization graphic segments that are intended for display, potentially in overlapping relation, in a two-dimensional output image, and converter means for deriving from said organization of graphic segments, output signals representative of said two-dimensional image with all overlap conflicts between segments resolved, the converter means being operative to locate each child segment in said image in dependence on image-related spatial transformations to which its parent is subject, characterized in that said organizing means is operative, as appropriate, to associate two segments as parent and child by an attachment relationship, and in that the converter means, in deriving said output signals, responds to a said attachment relationship by rendering the associated child segment as unrestricted by its parent outside the boundary of the latter.

As already indicated, the attachment relationship may be of an "above" or "below" type, the converter means being operative to render the child and parent segment appropriately where they overlap. The organization of graphic elements may also include a containment parent-child relationship where appropriate (though the provision of such a relationship is not essential to the present invention).

Where the same parent segment has a plurality of children associated with it by the same type of relationship, the organizing means is preferably operative to set the relative depth priorities of said children in dependence on current circumstances (including display history).

Advantageously, the converter means is operative to process said graphics segments in an order which for each parent and its children is as follows:

children associated by above attachment relationships with said parent;

the parent itself;

children associated by containment relationships with said parent; and children associated by below attachment relationships with said parent; children having the same relationship with the same parent being processed in the order of their relative depth priorities, and the converter means effecting its processing such that a segment being processed can only take precedence in said image over a previously processed segment where the latter is its first ancestor reached by a said attachment relationship when ascending the hierarchical organization of segments from said segment being processed. This processing order, which is generally the reverse of that utilized in the so-called painters algorithm, facilitates the clipping of children contained by their parents.

Advantageously, the converter means is operative to generate a set of spans for each of a plurality of lines used to form the image by a graphics output device (such as a visual display unit or printer), the graphics output system controlling the output device by a single primitive that causes the device it to draw a span of specified length, this primitive being issued as many times as necessary to build up each image line in turn.

BRIEF DESCRIPTION OF THE DRAWINGS

A graphics output system embodying the present invention, will now be described, by way of non-limiting example, with reference to the accompanying diagrammatic drawings, in which.

BEST MODE OF CARRYING OUT THE INVENTION

Figure 1:
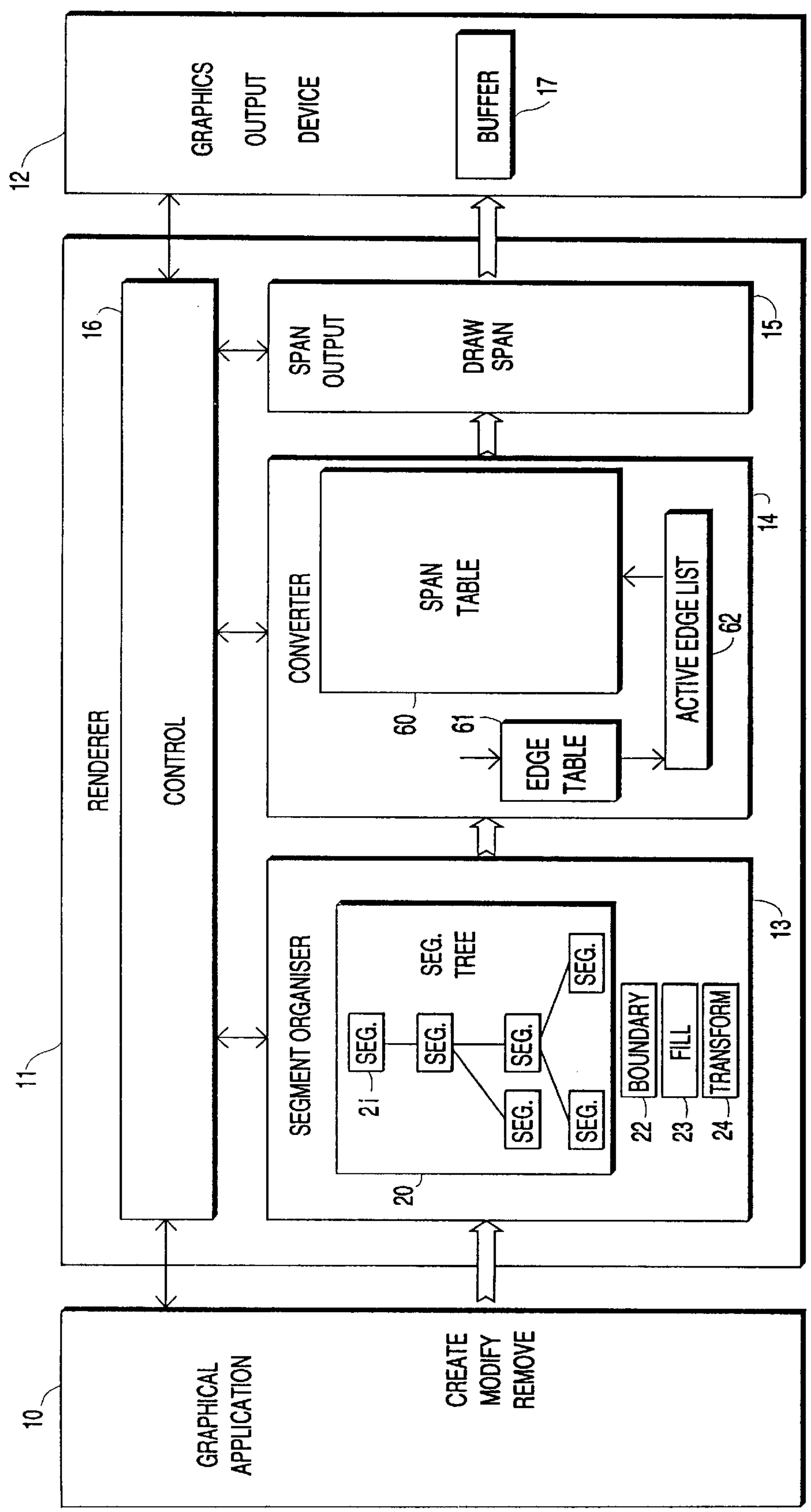
FIG. 1 is a functional block diagram of the graphics output system showing a renderer that serves both to organize graphic segments to be presented as a two-dimensional image, and to convert these segments into a series of spans held in a span table for output to a graphics output device.

The graphics output system shown in functional block diagram form in FIG. 1 basically comprises a renderer 11 operative to interface a graphical application 10 to a graphics output device 12 such as a video display unit or printer.

The graphical application 10 instructs the renderer 11 to build up an output image, this instruction being in the form of commands to create, modify or remove graphic segments 21. These graphics segments, which are the only graphic elements used to construct the output image, are created and stored in a segment organizer 13 of the renderer 11. The organizer 13 organizes the segments 21 into a segment tree 20 which, as will be more fully described hereinafter, determines the inter-relationship of the segments in the final image. The graphic segments 21 are such that they potentially overlap each other in the final image so that depth priority resolution is necessary.

Each graphic segment 21 is defined in terms of its boundary, fill and transform. These parameters are described more fully below and for the present it is sufficient to note that the parameters of boundary, fill and transform will generally be stored by the organizer 13 in respective data structures 22, 23 and 24 which are referenced by the segments 21 as required.

Once the graphical application 10 has finished instructing the renderer 11 to build up the desired output image in terms of the segment tree 20, this segment tree is converted by a converter 14 of the renderer 11 into a form suitable for output to the graphics output device 12. More particularly, the segment tree is converted into a span table 60 in which the image is represented as a succession of lines made up of one or more spans. As will be described hereinafter, in constructing the span table 60 the converter 14 first forms an edge table data structure 61 and then builds up each line of the output image using an active edge list data structure 62. The conversion process resolves any overlap conflicts between the segments in terms of their inter-relationships and depth priorities.

The image information contained in the span table 60 is then output to the graphics output device 12 by a span output process 15. This process may either output span information line by line as each line is completed or else wait until the span table is finished and then pass the span information to the device 12. The actual passing of span information is effected by a single primitive "Drawspan" that simply instructs the output device 12 to draw a span of specified length.

The graphics output device 12 will generally buffer information received from the renderer 11 in a buffer 17 before displaying/printing the final output image. In many cases, the buffer 17 will be a frame buffer holding a full image representation.

The overall operation of the renderer 11 is controlled by a control unit 16, the primary function of which is to sequence the operation of the various elements. In particular, the control unit 16 ensures that the converter 14 does not start its conversion process until the graphical application 10 has finished instructing the segment organizer 13 regarding the construction of the segment tree 20. Furthermore, the control unit 16 ensures that the span output process 15 is coordinated with the build up of the span table 60. It will be appreciated that although the control unit 16 has been shown as a distinct functional entity, in practice its functionality may well be embedded within the other functional elements; thus, for example, the segment organizer 13 may implement an interlock arrangement to ensure that the graphical application 10 and the converter 14 cannot simultaneously access the segment tree 20.

From the foregoing overview of the renderer 11, it can be seen that it provides a conceptually simple interface between the graphical application 10 and the graphics output device 12 since, on the one hand, its interface with the graphical application 10 is defined in terms of a single graphics element (namely the graphics segment 21) whilst, on the other hand, its interface with the graphics output device 12 is defined in terms of a single operational primitive (Drawspan). This latter feature ensures that the renderer 11 can be ported between the different output devices without difficulty.

Segments & Segment Organizer

The attributes and possible inter-relationships of a graphic segment 21 will now be described with reference to the segment 21A in FIG. 2 (it should be noted that in the present description the term "graphic segment" is applied to all representations of a segment—in the case of FIG. 2, the segment 21A is represented in terms of a data structure including fields 28 to 38 that define the parameters or attributes of the segment).

The first field associated with the segment 21A is a segment identity field 28 uniquely identifying the segment. The remaining defining fields are divided into two groups, namely a first group of fields 29 to 31 that are directly concerned with how the segment appears in the final image, and a second group of fields 34 to 38 that define the inter-relationship of the segment 21A with other segments in the segment tree 20 (these inter-relationships do, of course, also affect how the segment is displayed in the final image but this effect is less personal than that of the fields 29 to 31).

Field 29 defines the boundary of the segment in terms of one or more outlines specified by their defining points (i.e. vertices) where a point is an X-Y co-ordinate pair in an X,Y co-ordinate space in which the basic unit of distance in each co-ordinate direction is a "point-unit" (this is a conceptual unit that is used between the graphical application 10 and the renderer 11 and which is translated into real-world image dimensions in a manner to be described hereinafter). In fact, the segment data structure will generally not contain the full specification of the boundary but merely hold in field 29 a pointer to a boundary data structure 22 that contains the set or sets of defining points; this arrangement enables segments to share a common boundary definition. The segment boundary is considered to have zero width.

Within its boundary, a segment contains a "fill" that can be of one of three forms, namely a solid colour, a half-tone, or a bit map. In the case of a solid colour fill, the relevant colour specification will be held directly in a fill field 30; for other types of fill, the field 30 will hold a pointer to a fill data structure 23 that specifies the nature of the desired fill.

The boundary and fill fields 29, 30 define the basic form and content of the segment 21A. Its position relative to a parent segment is then defined by a Relative Transformation Matrix (RTM) specified in a field 31; again, this specification will generally be in terms of a pointer held in the field 31 and pointing to a transform data structure 24.

The Relative Transformation Matrix (RTM) is a three by three matrix of the form:

Sx Ry 0

Rx Sy 0

Tx Ty 1

The RTM is used to transform a point (and Boundaries because they are composed entirely of points) in one co-ordinate space to the corresponding point defined by the matrix; Sx and Sy apply scaling of the X and Y components. Tx and Ty provide translations for the X and Y components of a point. Rx and Ry are X and Y shear values which, in combination with Sx and Sy are used to provide rotation. The last column of the matrix is provided to allow concatenation of several three by three matrices into a single matrix by simple matrix multiplication.

The second group of fields 34 to 38 of the segment 21A define the relationship of the segment 21A with other segments by means of pointers to these other segments. Thus, the field 34 contains a pointer to a segment 21P that constitutes a parent segment for the segment 21A. The field 35 contains a pointer to a sibling segment 21S(1) of the segment 21A (that is, a segment which has both the same parent 21P as the segment 21A). The sibling relationship of the segments 21A and 21S(1) is indicated in FIG. 2 by the arrow 39. The sibling segment 21S(1) may likewise contain a sibling pointer to a further sibling 21S(2). Similarly, the segment 21A 30 may itself be pointed to by another sibling (not shown). In this manner, a sibling chain is established for siblings having the same parent segment 21P. In fact, as will become clear below, separate sibling chains exist for siblings which, while having the same parent, have different relationships with that parent. The ordering of the siblings in a sibling chain determines the relative depth priorities of the siblings.

The segment 21A also contains three pointers in fields 36, 37, and 38, to child segments 21C, each pointer pointing to a different type of child segment. Thus, the field 36 points to child segments 21C that are in an "above attachment" relationship with the segment 21A, this relationship being indicated by arrow 40 in FIG. 2. In fact, the pointer contained in field 36 points to the first child in a sibling chain 25 of all segments 21C associated with the segment 21A by an above-attachment relationship. Similarly, the pointer held in field 37 points to the first child segment 21C in a sibling chain 26 containing all child segments associated with the segment 21A by a "containment" relationship 41. Again, the pointer held in the field 38 points to the first child segment 21C of a below sibling chain 27 of child segments that are associated with the segment 21A by a "below-attachment" relationship 42. The nature of the above-attachment, containment, and below-attachment relationships will be described hereinafter. From the foregoing, it can be seen that the segment 21A has one parent segment; none, one or more sibling segments; and none, one or more children segments arranged in three chains 25, 26 and 27.

Figure 2:
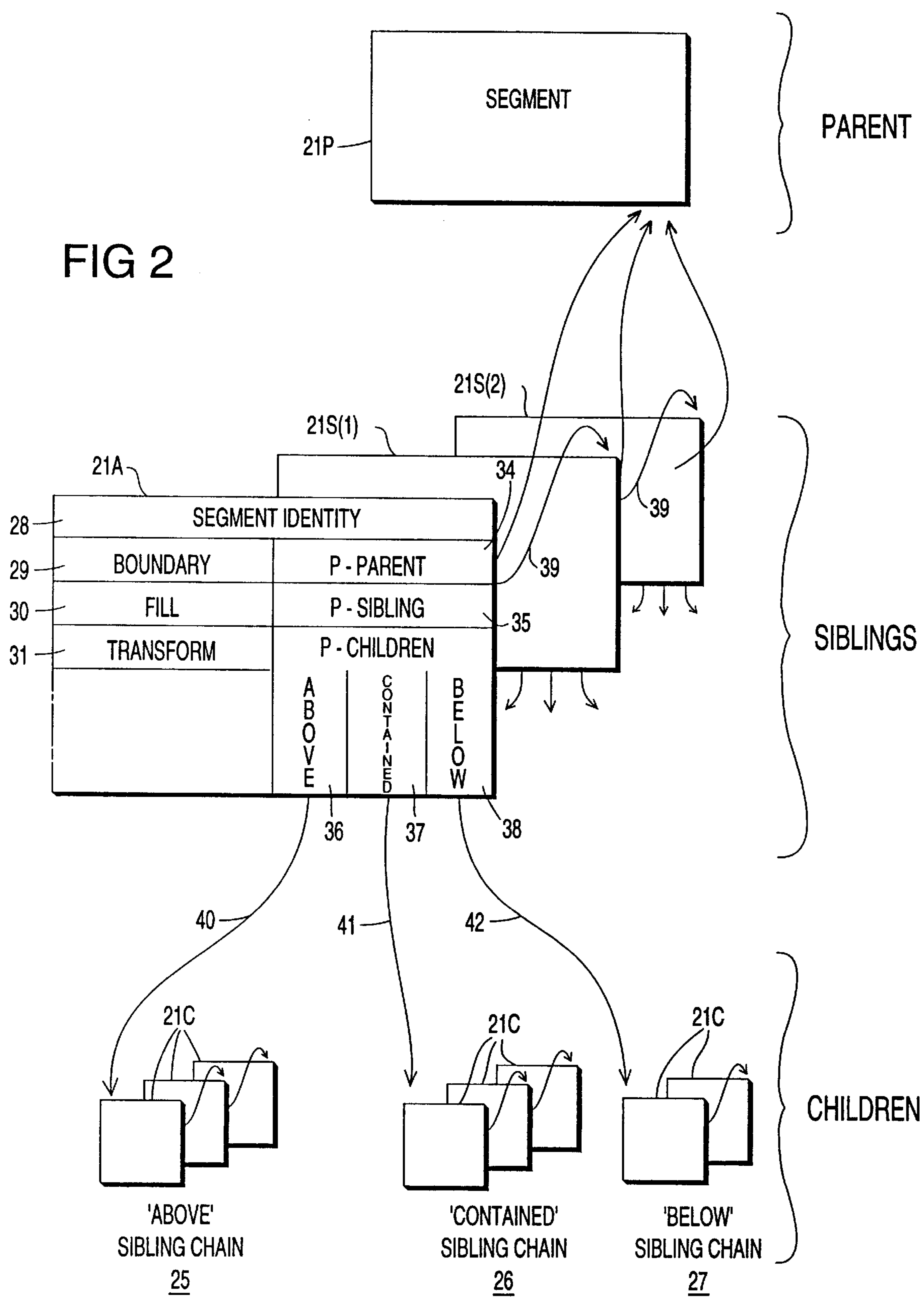
FIG. 2 is a diagram illustrating the data fields associated with a graphic segment and the possible inter-relationships of that segment with other segments.

It will be appreciated that in FIG. 2 only the segment 21A has had its full set of outward relationships described, the other segments iustrated in FIG. 2 having only some of their inter-relationships indicated.

By appropriate setting of the parent, sibling and child pointers held in the fields 34 to 38, it is possible to inter-relate a group of segments into an acyclic tree organization constituting the segment tree 20. The relationships between the segments in the tree serve to fully specify how the various segments affect each other in the final image.

Figure 3:
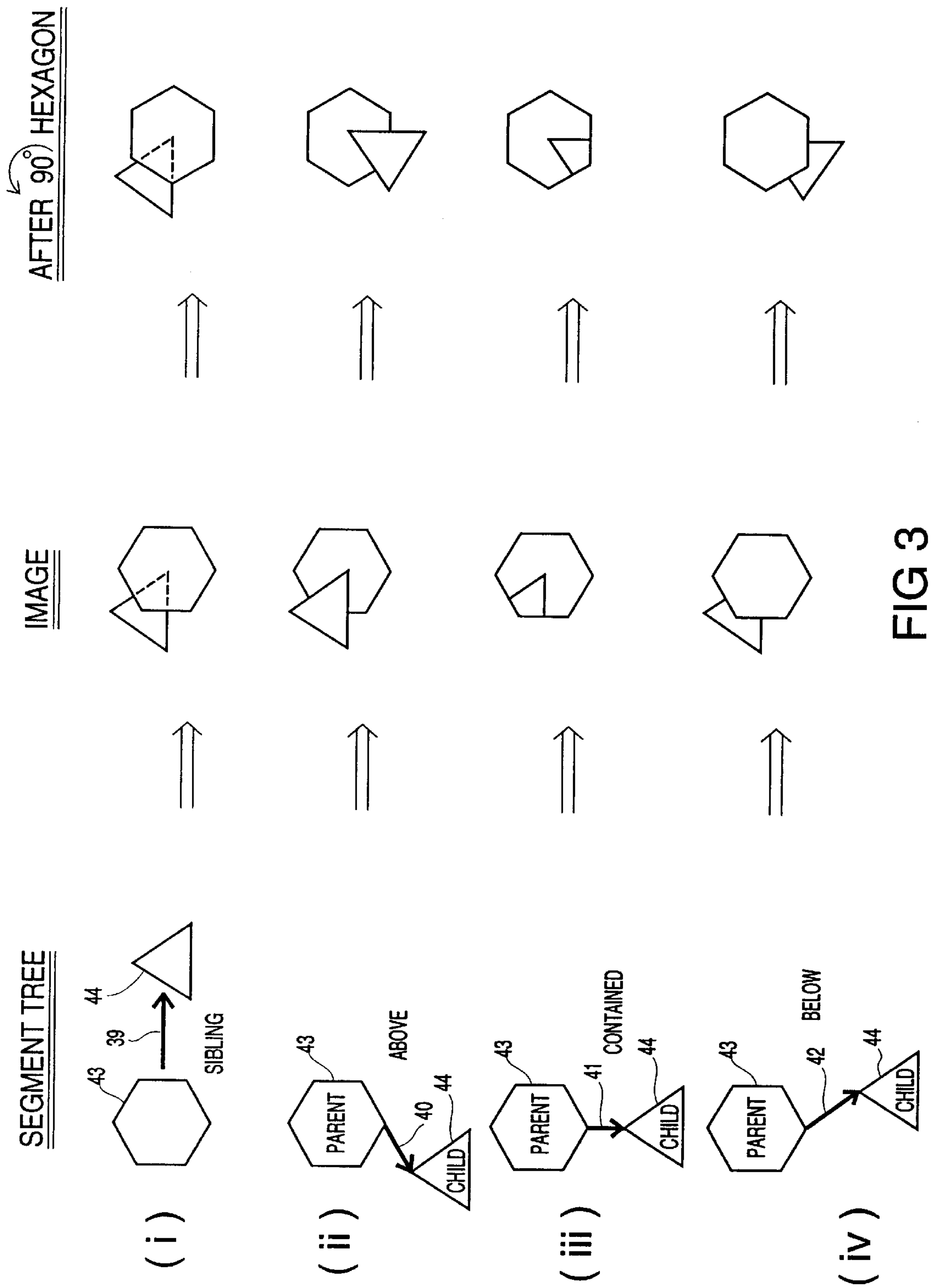
FIG. 3 is a diagram showing the nature of the various inter-segment relationships illustrated in FIG. 2 in terms of the resultant two-dimensional image formed from the segments concerned.

The nature of the "sibling", "contained", "above-attachment" and "below-attachment" relationships will now be described with reference to FIG. 3. In this Figure, a hexagon-shaped segment 43 and a tirangular-shaped segment 44 are shown inter-related by each of the foregoing relationships. More particularly, the sibling relationship 39 is depicted in row (i), the above-attachment relationship 40 is shown in row (ii), the containment relationship 41 is shown in row (iii) and the below-containment relationship 42 is shown in row (iv). On the left hand side of each row the segment tree representation of the relationship is depicted. In the middle of each row the appearance of the segments in the output image is shown (for a given transformation of the segment 44 relative to the segment 43). On the right hand side of each row the appearance of the segments in the final image is shown after the hexagon-shaped 43 has been subject to an anti-clockwise rotation through 90°.

It can be seen from row (i) that when a segment 44 is in a sibling relationship to another segment 43, the segment further down the sibling chain has a lower depth priority and so is displayed behind the sibling higher up the sibling chain (in other words, the triangular segment 44 is displayed behind the hexagon segment 43 where these two segments overlap). Row (i) also shows the relative independence of the segments 43, 44 in that the segment 43 can be subject to spatial transformations without affecting the segment 44 (the converse is also true, although not illustrated in FIG. 3).

Row (ii) shows that where the triangular segment 44 is related to the parent segment by an above-attachment relationship, the segment 44 has a higher depth priority than the segment 43 and so appears above the latter where the two segments overlap. Furthermore, the segment 44 is not restricted to the boundary of its parent segment 43. However, the segment 44 is a true child segment of the parent 43 in that it is subject to spatial transformations experienced by its parent 43; thus when the hexagon segment is rotated through 90°, the child segment 44 is similarly rotated and maintains its position relative to the parent segment 43.

The containment relationship illustrated in row (iii) has similarities to the above-attachment relationship in that the child segment 44 overwrites its parent 43 where the two segments overlap. However, this time the child segment 44 is clipped to the boundary of its parent 43 (that is, it does not extend beyond the boundary of its parent). As with all children, the contained child segment 44 is subject to spatial transformations experienced by its parent 43, so that rotation of the latter through 90° also causes the segment 44 to be rotated to maintain its position relative to its parent segment 43.

Row (iv) shows that where a child segment 44 is in a below-attachment relationship to its parent 43, the parent has a higher depth priority where the two segments overlap and will therefore be displayed above the latter in the final output image. As with the above-attachment relationship, for the below-attachment relationship the child segment 44 is not restricted by the boundary of its parent 43 and can extend beyond the latter boundary. This is in contrast to the containment relationship where the child is, of course, clipped to the boundary of its parent. The below-attachment relationship like the other parent-child relationships results in the child segment 44 being subject to spatial transformations experienced by its parent so that, for example, rotation of the parent segment 43 through 90° results in the child segment being similarly rotated and maintaining its position relative to its parent.

A child segment, as well as having the above-described direct relationship with its parent, also inherits the following from its parent:

(a) spatial transformation inherited by the parent from its parent whereby the final image position, orientation and size of a segment are determined by the combination of all the spatial transformations of its ancestors together with the spatial transformation of the segment relative to its parent, (in terms of the RTMs of the segments, the overall transformation of a segment is a concatenation of the Relative Transformation Matrices all its ancestors together with its own RTM to give a cumulative transformation matrix herein referred to as the Concatenation Transformation Matrix or CTM);

(b) depth priority and clipping restrictions to which its parent is subject, this being of particular relevance to any child related to its parent by an above or below attachment relationship since it determines clipping and overwriting of the child beyond the boundary of its parent.

The latter inheritance gives rise to the concept that each child segment has a "background" segment which the child can overwrite but which also clips the child segment to lie within the boundary of the background segment. Where a child segment is associated with its parent by a containment relationship, then the parent also constitutes the background segment for the child. However, where the child is associated with its parent by an above or below attachment relationship, then the background segment for the child is not its parent but the first ancestor segment reached through a containment relationship when ascending the segment tree from the child segment concerned; in fact, this latter identification of a child's background segment is generally true, since where the child is related to its parent by a containment relationship, then the first ancestor segment reached from the child across a containment relationship will, of course, be the child's parent.

Figure 4:
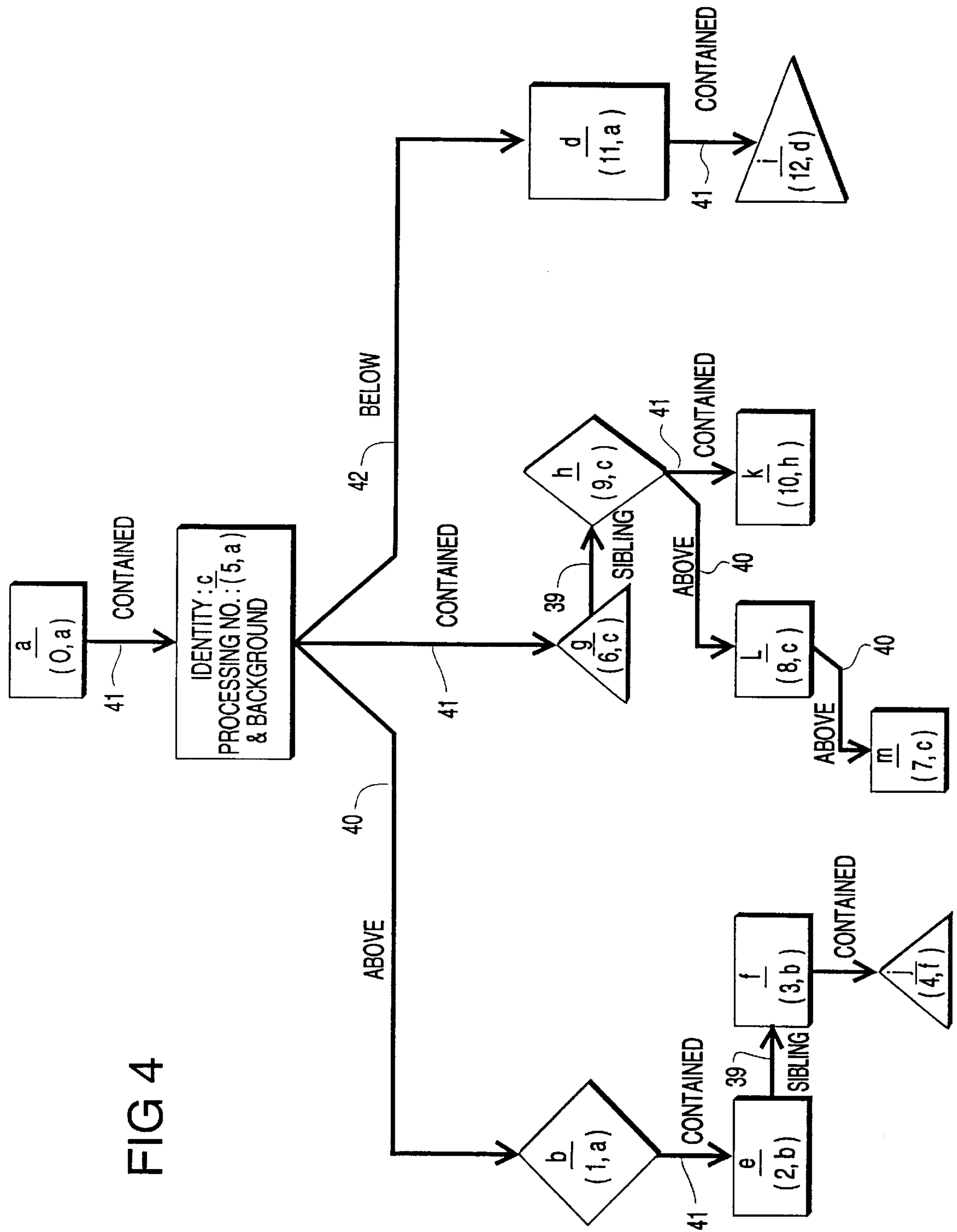
FIG. 4 shows one example of a segment tree formed by the renderer of FIG. 1.
Figure 5:
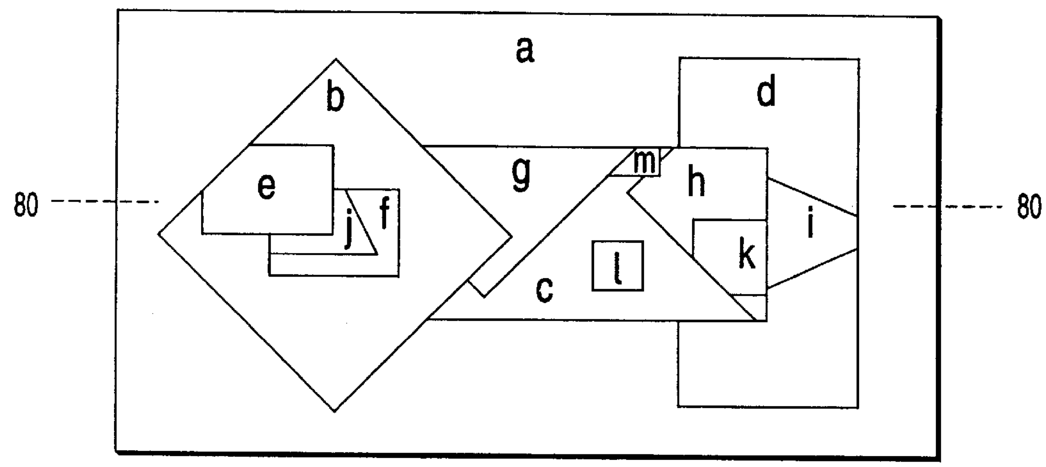
FIG. 5 shows the two-dimensional image corresponding to the example segment tree of FIG. 4.

FIGS. 4 and 5 show an example of a segment tree and the corresponding output image. In the segment tree of FIG. 4, the segments have been presented by their outlines and have been signed identification letters "a" to "m", these identifying letters being shown underlined within the segment boundaries. Also within each segment boundary is a (number, letter) pair shown in brackets; the letter of this pair identifies the background segment of the segment concerned whilst the number in the (number, letter) pair is a processing order number the purpose of which will be described below.

Segment "a" of the FIG. 4 segment tree is the root segment of the tree and, as such, is of particular significance. The scaling factors contained in the Relative Transformation Matrix of the root segment effectively define the scaling between the internal point-unit dimensions used by the renderer 11 and the dimensions of the output image displayed by the graphics output device 12 (frequently expressed in terms of pixels). In addition, the size of the root segment as defined by its boundary will generally be set to completely occupy the potential output image area made available by the output device 12 (after appropriate scaling as defined in the root's RTM). Generally, all other segments of the segment tree will be directly or indirectly associated with the root segment through a containment relationship 41 so that they will be clipped to lie within the boundary of the root segment. The only segments that are normally attached to the root segment by an above-attachment relationship are segments which are subject to rapid movement across the output image (for example, cursors in inter-active applications). Since the root segment generally completely occupies the output image, the below-attachment relationship is not used directly from the root segment.

FIG. 5 shows the root segment "a" as a rectangle bounding the limits of the output image with all other segments contained within the root segment.

Segment "c" is in fact the only segment in a direct containment relationship with the root segment. As can be seen, the segment "c" has three groups of children, namely an above-group that can appear above segment "c" (segments b,e,f,j), a contained group of segments that are clipped to the boundary of, but can overwrite, segment "c" (segments g,h,l,m,k) and a group of below segments that appear below segment "c" (segments d and i). Movement or rotation of segment "c" within the root segment "a" (by modification of the RTM of segment "c") results in all its child segments being similarly moved.

The construction of the output image of FIG. 5 from the segment tree of FIG. 4 should be apparent having regard to the foregoing description concerning the nature of the possible relationships between segments. Accordingly, a detailed description of FIGS. 4 and 5 will not be given herein. However, a number of significant features are noted below.

The relative depth priorities of siblings is illustrated in FIGS. 4 and 5 by the segments "e" and "f". As can be seen, the segment "f" is a sibling of segment "e" but has a lower depth priority since it appears further down the sibling chain for contained child segments of parent segment "b". Accordingly, where segments "e" and "f" overlap, segment "e" is displayed in the output image. Segment "e" also overlaps the contained child of segment "f", this child being segment "j" (segment "e" would also overlap any above or below children of segment "f").

Segment "l" shows a segment related to its parent by an above-attachment relationship and illustrates the fact that such a segment, although taking priority over its parent should they overlap, does not in fact have to overlap its parent; whether or not an overlap occurs depends on the Relative Transformation Matrix of the child segment "l".

Segment "m" is a segment which is in an above-attachment relationship to segment "l" which as already noted is also in an above-attachment relationship to segment "h". Both these segments are written on segment "c" which constitutes the background segment for segment "l" and "m". As can be seen in respect of segment "m", a segment is clipped by its background segment even when the latter is not in a direct containment relationship.

Returning now to consideration of FIG. 1, the segment organizer 13 will generally take the form of appropriate program code running on a general purpose processor, the code being responsive to create, modify and remove commands from the graphical application to construct a segment tree 20. More particularly, the segment organizer 13 may be implemented in an object-oriented idiom with class objects being provided to create segment, boundary, fill and transform instance objects as required. In this case, where, for example, the graphical application 10 wishes to create a new segment and add it to an existing tree structure, it does so by first messaging the class objects for transform, fill and boundary in order to create appropriate instances of transform, fill and boundary (assuming that appropriate instances do not already exist). In messaging the class objects to create the appropriate transform, fill and boundary instances, the application 10 will provide the necessary data. Next, the application 10 messages the segment class object requesting it to create a new segment instance utilizing the newly created boundary, fill and transform instances and having associations with other segments as specified by the application 10. In creating a new segment, it may, for example, be necessary to specify the segment as having a sibling priority higher than existing siblings. This will, of course, require pointer adjustments in the existing parent and sibling segments. Such adjustment will be handled by the segment instant objects themselves by appropriate messaging between the objects. Implementational details of such an object-oriented version of the segment organizer 13 will be apparent to persons skilled in the art and will therefore not be described further herein.

It may be noted that at the time the segment tree 20 is being constructed by the organizer 13 in response to commands on the graphical application 10, certain data items may be calculated to facilitate subsequent operation of the converter 14. In particular the Concatenation Transformation Matrix and background segment of each segment may be determined and cached for use by the converter 14. However, in the present embodiment these items are determined by the converter 14 itself.

Conversion to Span Table

The converter 14 effects a conversion process by which the segments of the segment tree 20 are converted into a set of image lines each represented by a span list containing one or more spans, the span lists being stored in the span table 60. In this conversion process, segments are correctly positioned in the final image, any overlap conflicts are resolved, and the segments are scaled from internal, point-unit co-ordinates to device co-ordinates. The device coordinates are generally specified in terms of pixels in an X,Y co-ordinate frame of reference. The image lines represented by the span lists extend in the Y co-ordinate direction of the device frame of reference (this is because the buffer 17 will generally be organized such that pixels on the same image line are adjacent in the buffer thereby increasing efficiency of access); it will be appreciated that in appropriate circumstances, the span lists could be arranged to extend in the X co-ordinate direction.

Figure 6:
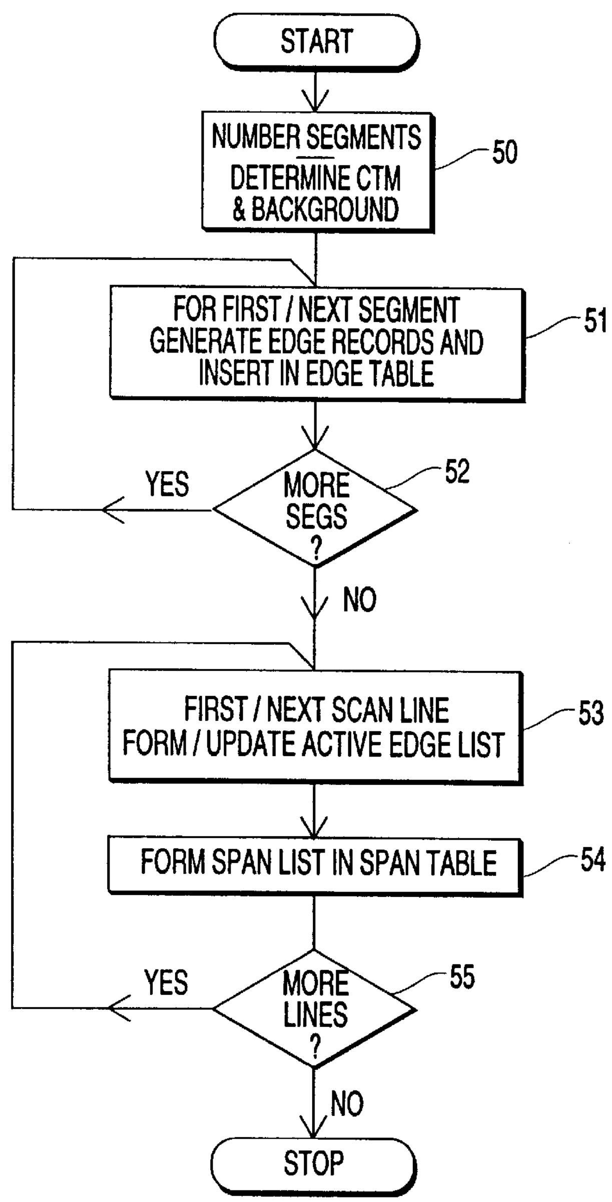
FIG. 6 is a flow chart illustrating the general progression of the conversion process effected by the FIG. 1 renderer in forming the scan table from the segment tree.

The general progression of the conversion process is illustrated in FIG. 6. The first step of the conversion process is for the segments to be numbered in the order that they are to be processed (step 50). Thereafter, the CTM and background segment are determined (in fact, this determination can conveniently be done during segment numbering and so has been shown as part of step 50). Next, an edge table is formed containing edge records on all the defining edges of all the segments (step 51 and 52). Finally, the span table is built up a line at a time by examining the edge records of the edges that intersect with the current image line of interest (steps 53–55).

Considering first the segment processing order number (step 50), the general purpose here is to ensure that segments are processed in their depth priority order so that overlap conflicts are simply resolved by not allowing subsequently processed segments to overwrite previously processed ones. However, because contained children and their descendants are clipped to the boundary of their containing ancestors, it is necessary for a background segment to be processed before its contained children (and their descendants) even though the latter overwrite the former, since otherwise the clipping boundary would not be known in image coordinate terms at the time the contained children were being processed. This requirement leads to the basic writing rule that later processed segments cannot overwrite earlier processed ones being modified by the proviso that a segment may overwrite its background segment.

In numbering the segments the tree is traversed from the root segment. For each segment the following rule is then applied regarding the precedence of numbering of associated segments:

above children (and all their descendants) of the segment under consideration are numbered first;

thereafter the segment under consideration is numbered;

next, the contained segments (and their descendants) of the segment under consideration are numbered;

finally, the below segments (and their descendants) of the segment under consideration are numbered.

With regard to siblings, these are handled starting at the head of the list so that the sibling segment at the head of the list and all of its descendants will be numbered before the second sibling (and all its descendants) are numbered and so on for other siblings in the same sibling list. The traversal numbering algorithm may be more formally represented by the following pseudo code:

PROCNUM Recursive routine for allocating processing order number.

"This_Seg"=current parent segment—local

"S"=child of interest—local

"Number"=processing order number—global

1. Starting with S set to first above child of This_Seg, repeat the following until no more above children of This_Seg, with S being set to the next above child before each repeat:

Do routine PROCNUM for segment S as the current parent segment.

2. Increment Number.
3. Allocate Number as the processing order number of This_Seg.
4. Starting with S set to first contained child of This_Seg, repeat the following until no more contained children of This_Seg, with S being set to the next contained child before each repeat:

Do routine PROCNUM for segment S as the current parent segment.

5. Starting with S set to first below child of This-Seg, repeat the following until no more below children of This_Seg, with S being set to the next below child before each repeat:

Do routine PROCNUM for segment S as the current parent segment.

Using the allotted processing order number, the output image can be drawn up from the segment tree according to the above-described writing rule that a later processed segment cannot overwrite an earlier processed one except where the earlier segment is the background segment of the later processed segment.

The foregoing writing rule for converting a segment tree to an image applies regardless of the process details involved in this conversion. In other words, it applies not only for the processing effected by the converter 14 but also for physically drawing up an image by hand from a segment tree. This will be readily appreciated if the reader reproduces FIG. 5 working from the segment tree of FIG. 4 utilizing the processing order numbering that has already been annotated to the segments (this numbering having been determined in accordance with the above numbering algorithm).

After the segments have been numbered (or, as already indicated, concurrently with this numbering), the CTM and background of each segment are determined. Each determination can be readily achieved using a stack (a Last In First Out or LIFO data structure).

Thus, with regard to CTM determination, the RTM of the root segment (which is also its CTM) is first put in a CTM stack and the segment tree is then traversed. Each time a segment is first encountered by being reached by descending down a parent-child relationship or across a sibling relationship, its CTM is determined by combining its RTM with the CTM on top of the CTM stack. The newly-determined CTM is then cached with the segment data, and, in addition, placed on top of the stack. Whenever a segment is exited by ascending a parent-child relationship or by crossing a sibling relationship, then its CTM is removed from the top of the CTM stack.

Background-segment determination is effected in a similar manner with a background stack being initialized to empty before traversal of the segment tree is begun. Each time a parent-child containment relationship is descended, the identity of the parent is entered into the background stack whilst each time a containment relationship is ascended, the top stack entry is removed. The top entry in the background stack identifies the background segment for the segment currently reached during traversal of the tree; the identity of a segment's background is cached with the segment data.

After the segments have been numbered and their CTMs and backgrounds determined, the edge table 61 is created and filled (steps 51, and 52). The edge table is a data structure that contains an entry for each Y-coordinate line of the output image. The entry for each line is a list of all segment edges in device (image) co-ordinate terms that have their starting Y co-ordinate on that line, this list being formed by a linked list of edge records 63, with the first edge record in the list being pointed to by a pointer held in the edge table data structure 61. Where there are no edges having a starting Y coordinate corresponding to a particular Y-coordinate line, the corresponding entry in the edge table is set to null.

Each edge record 63 contains data describing the corresponding segment edge in device co-ordinate terms together with the identity of the segment from which the edge originates and preferably the processing order number and background of that segment (though these latter items can always be obtained when required by referring to the segment itself).

The edge table is populated by processing each segment in turn according to the processing order number. In fact, where the whole output image is to be rendered, the order in which the segments are processed to form the edge table does not matter. To process a segment, each edge of the or each outline making up the segment boundary is transformed into its output image form by application of the CTM of the segment and data characterizing the resultant edge is stored in a corresponding edge record 63. This record is then inserted into the edge table 61 where appropriate.

Figure 7:
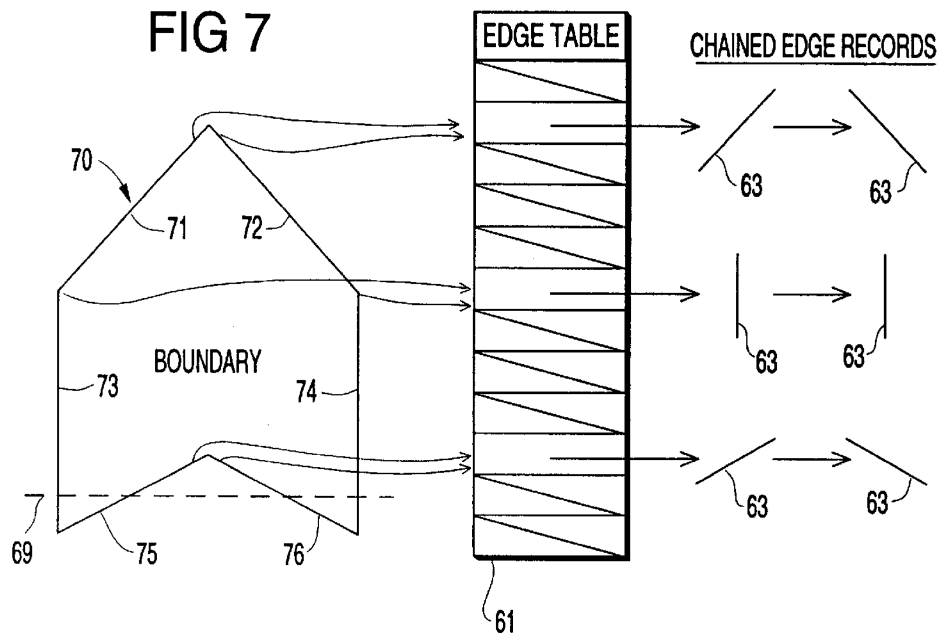
FIG. 7 is a diagram illustrating a step of the FIG. 6 conversion process in which an edge table is formed containing edge records for all the graphic segments.

FIG. 7 illustrates the processing of one segment to enter its edges into the edge table 61. As can be seen, the boundary 70 of the segment is composed of six edges 71 to 76. Edges 71 and 72 have the same starting Y coordinate and are accordingly entered as edge records 63 into the same edge list of the edge table 61. Similarly edges 73 and 74 have the same starting Y coordinates causing their edge records to be entered in the same edge list. Again, edges 75 and 76 also have the same starting Y coordinate and have their edge records 63 entered in the same edge list of the edge table 61.

Once all the edges have been entered into the edge table 61, the conversion process moves onto its next phase in which for each scan line (y-coordinate line of the output image) an active edge list 62 is formed listing all the edges intercepting the scan line (step 53), the active edge list is then used to form a corresponding span list in the span table 60 (step 54). The active edge list 62 is formed for the first scan line by entering into the active edge list all edge records 63 starting at the first line. For subsequent scan lines, the active edge list 62 is formed by updating the active edge list for the preceding scan line. This updating process involves both adding in edge records for edges that start at the current scan line, and updating the edge records already included in the active edge list. This updating involves updating the current X and Y coordinate values for the edge by changing the X coordinate according to the gradient of the edge and incrementing the Y value. In the event that this updating indicates that the edge no longer intercepts the scan line, then the edge record 63 is removed from the active edge list 62.

Figure 8:
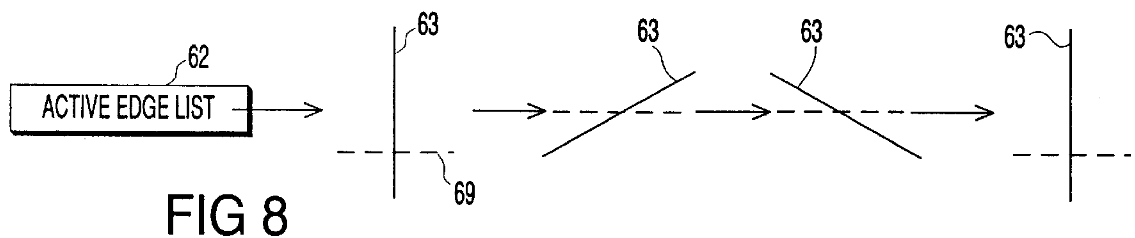
FIG. 8 is a diagram illustrating the nature of an active edge list formed during the course of the FIG. 6 conversion process.
Figure 9:
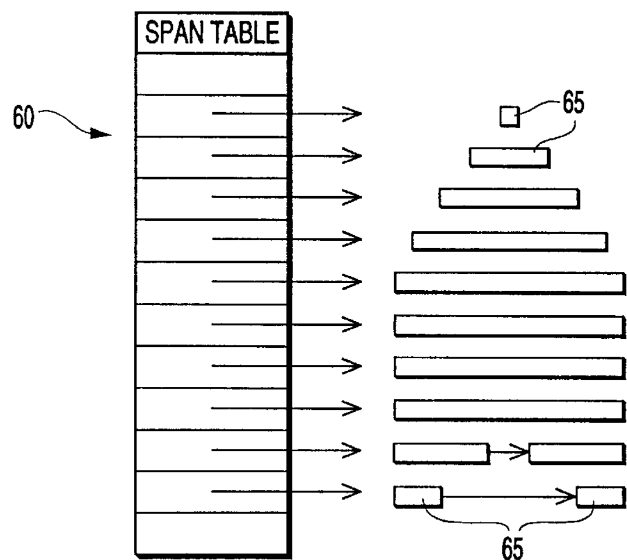
FIG. 9 is a diagram illustrating the nature of the span table produced by the FIG. 6 conversion process.

FIG. 8 shows the edge records 63 constituting the active edge list 62 for the scan line 69 shown dashed in FIG. 7. The interception of the current scan line with the edges represented by the edge records are shown in FIG. 8.

After the active edge list for a scan line has been formed, the constituent edge records are sorted according to their associated segment processing order number, and on the current X interception point of the scan line and the edge.

Figure 10:
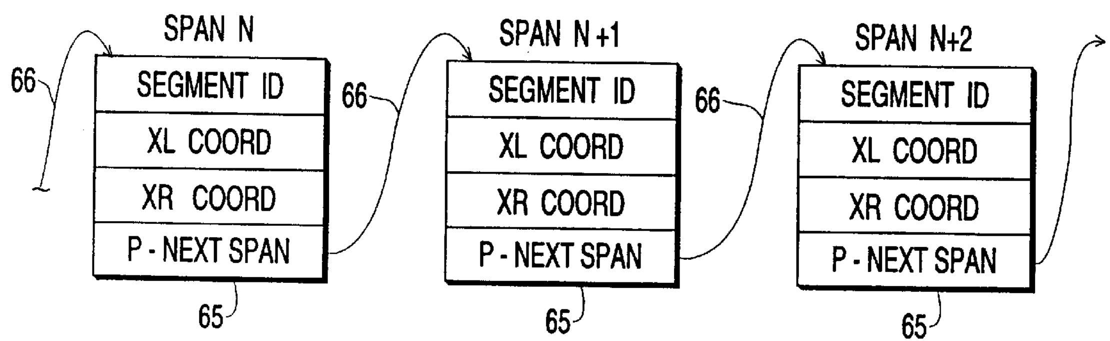
FIG. 10 is a diagram illustrating three inter-linked span data structures.

Using the sorted active edge list 62, the span table entry corresponding to the current scan line is created. This span table entry comprises a span list holding one or more spans 65 as a linked list. A span defines an uninterrupted section of an output-image scan line associated with a particular segment. FIG. 10 illustrates a portion of a scan list comprising three spans 65 identified as spans N, (N+1) and (N+2). Each span has four fields one of which identifies the relevant segment whilst two locate the span in terms of its left and right X-coordinates (XL and XR respectively); a Y coordinate field is not essential because the span table data structure implies the Y-coordinate for the spans of each constituent span list, by the position of a span list in the span table. The remaining field of the span data structure is a pointer, namely a pointer 66 (P-NextSpan) that points to the next span (if any) in the current span list.

To form the span list, the active edge list is processed by taking successive pairs of edge records in the list and using each pair to form a corresponding span with its two delimiting X-coordinate values set to the current X values of the edge records concerned, the Y-coordinate value set to that of the current scan line, and its segment identity set to that of the two edge records concerned (these records will have the same segment identity because the active edge list has been sorted according to processing order number and there are always an even number of edges to a segment when considered at any Y-coordinate value).

Once a span has been formed, an attempt is then made to insert it into the span list for the current scan line. However, this insertion is subject to the above-mentioned rule for writing segments in the final image when processed according to their processing order number—namely that a segment (or, in this case, a span of a segment) can only be written if it does not overwrite another segment (or segment span), except where the segment to be overwritten is the background segment for the current segment. The identity of the segment constituting the background that can be overwritten by the current span is obtainable either from the edge records delimiting the span or by reference to the segment from which the span is derived.

The insertion process involves adjusting the delimiting X-coordinate values of the span being merged, and of any partially overwritten spans, as appropriate (including splitting affected spans into two or more spans where required), and setting the P-Nextspan pointers of affected spans accordingly.

Figure 11:
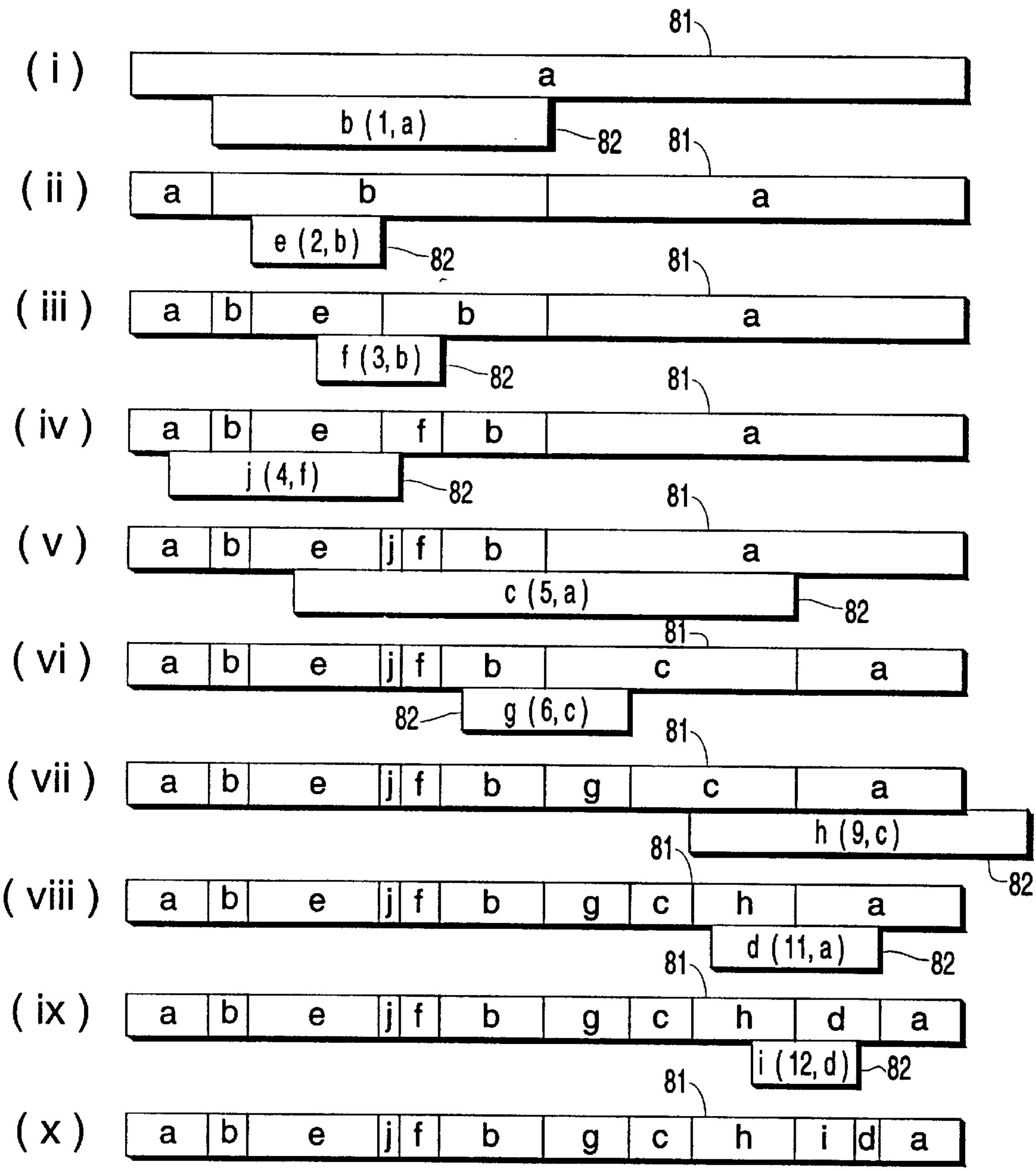
FIG. 11 is a diagram illustrating the build up of one span list of the span table for the example segment tree and image of FIGS. 4 and 5.

FIG. 11 is an example showing in ten stages the construction of a span list 81 for the scan line taken on line 80—80 in FIG. 5. For each stage (i) to (x) illustrated in FIG. 11, both the current contents of the span list 81 and the span 82 to be merged into the span list, are shown, the span 82 being shown below the existing span list 81.

Within each span 82 to be merged into the span list, not only has the identity of the corresponding segment been shown, but also the (processing number, background segment) pair in order to facilitate an appreciation both of the order in which segment spans are processed and whether overwriting of the span into the existing span list will be successful.

In stage (i) the span list is shown as already holding a span corresponding to the root segment "a". The span 82 to be merged is a span from segment "b", this being the next segment to be processed according to the processing order number of the segments that intersect the scan line 80—80. The background segment for segment "b" is the root segment "a"; as a result, the span 82 for segment "b" can be fully merged into the span list. The resultant span list 81 is shown in stage (ii) of FIG. 10 and, as can be seen, the span list now comprises three spans linked together since the span originally corresponding to the root segment "a" has been split into two spans by the segment "b" span.

In stage (ii), a span 82 corresponding to segment "e" is merged into the span list 81. Since the background for segment "e" is segment "b" and since the span 82 lies wholly within the bounds of the segment "e" span in the span list 81, the whole of the segment "e" span 82 is successfully merged into the span list to produce a new span list 81 shown in stage (iii).

In stage (iii), a span 82 from segment "f" is to be merged into the span list 81, the background segment for segment "f" being segment "b". Since the segment "f" span 82 overlaps spans corresponding to segments "e" and "b" in the span list 81, only part of the span 82 will be merged into the span list 82, this part being the part overlapping the background segment "b" of segment "f". The resultant partial merge of segment "f" span 82 into the span list is shown by the new span list 81 in stage (iv).

The merging of the spans 82 into the span list 81 effected in stages (iv) to (x) proceeds in substantially the same manner as for stages (i) to (iii) and will therefore not be described in detail.

At the end of the conversion process, the segment tree 20 has been converted into a span table representation of the image in which all segments have been mapped into the final output image in their correct location, orientation and size and all overlap conflicts have been resolved. The span table 60 provides a compressed representation of the final output image in device coordinate terms.

As with the segment organizer 13, the converter 15 is preferably implemented in code running on a general purpose processor, this implementation being, for example, in an object-oriented idiom with objects corresponding to the edge table, the edge list, the edge records, the active edge list, the span table, the span lists and the spans.

Output Process

As already indicated, the span output function 15 of FIG. 1 has a single operational primitive Drawspan that commands the output device 12 to draw a line of given colour at a given Y coordinate position and between two X coordinate positions. The output process involves calling Drawspan for each of the spans in the final span table 60. Because the spans of the span table do not overlap, and are each fully defined in their own right, the order in which the spans are output to the device 12 using Drawspan is not critical. For maximum transfer efficiency, spans of the same colour can be output together so that it becomes only necessary to specify colour when this colour is to be changed (it will, of course, be appreciated that this can only be done with certain types of output device 12 where random writing of the image is possible).

The colour associated with each span in the span table is obtained by referring to the fill of the corresponding segment. Where this fill is a polychromatic bit map, then the Drawspan must be called for each mono-chromatic component sub-span.

Upon initialization of the system, the output process may initialize a colour look-up table in cooperation with the output device. At the same time, parameters such as extra-image background colour and image size may be specified. As already indicated, image size is reflected in the size of the root segment and of the scaling factors in the root segment's RTM.

The output device 12 will generally construct one or more scan lines in the buffer 17 before the scan lines are output to the real world either in the form of a display on a visual display unit or a hard copy print out. Where the buffer 17 does not hold a full image bit map, then the order in which the spans are output using Drawspan becomes important since the output device will require certain scan lines to be output before others.

Updating and User Input

In the foregoing, the FIG. 1 embodiment has been described in terms of a complete segment tree being constructed by the application 10 and then output by the renderer 11 to the output device 12. It will be appreciated that the segment tree rather than having to be recreated each time there is a change in the image to be represented, can be modified as required by use of the create, modify and delete commands by the application 10. Once modification of the segment tree is complete, then it can be converted into a new output image. This conversion may be repeated from the beginning each time a new image is to be created; alternatively a limited conversion process may be effected as is known in the art where, for example, reconversion is limited to a rectangular bounding box delimiting the updated area of the image.

Partial updating of the segment tree and reconversion of part of the output image are primarily of interest where the output device is a visual display unit rather than a hard copy device.

With regard to user input such as is required in interactive computer graphics applications where the displayed image is changed in response to user input, the above-described graphics output system can be used with any suitable means for feeding back user input to the application 10, it being the job of the application 10 to determine what image changes are required.

Variants

It will be appreciated that the above-described embodiment of the present invention can be subject to many variations without departing from the concept of the present invention as set out in the accompanying claims. Thus, the converter 14 is capable of implementation in a variety of ways and it is not essential, for example, to construct a full span table as each scan line can be output immediately after completion of the corresponding span list (in this case, it would not, of course, be possible to output all spans of the same colour together unless separately buffered).

With regard to the segment organizer and the segment tree 20, the segments 21 can be organized in a hierarchical structure other than the described acyclic tree whilst still providing for above and below attachment relationships. Furthermore, either of these latter relationships can be implemented without the other and independently of the containment relationship (though this is not preferred).

I claim:

1. In a graphics system, a hierarchical organization of graphic segments that potentially overlap when presented as a two-dimensional image, each one of a plurality of child segments in said organization inheriting image-related spatial transformations to which a corresponding parent is subject, characterized in that said organization includes an attachment relationship between a child segment and its corresponding parent in which the child segment is uncurtailed by a boundary of said corresponding parent in said image whilst remaining subject to said spatial transformations inherited therefrom.

2. An organization of graphics segments according to claim 1, including said attachment relationship in which the child segment has a higher depth priority than its corresponding parent resulting in its display on top of its corresponding parent in said image where the child segment and parent overlap.

3. An organization of graphics segments according to claim 1, including said attachment relationship in which the child segment has a lower depth priority than its corresponding parent resulting in its corresponding parent being displayed on top in said image where the child segment and parent overlap.

4. An organization of graphic segments according to claim 1, wherein each one of said plurality of child segments inherits all image-related spatial transformations to which its corresponding parent is subject.

5. A graphics output system comprising:

organizing means for organizing into a hierarchical organization graphic segments that are intended for display, potentially in overlapping relation, in a two-dimensional output image, and converter means for deriving from said organization of graphic segments, output signals representative of said two-dimensional image with all overlap conflicts between segments resolved, the converter means being operative to locate each one of a plurality of child segments in said image in dependence on image-related spatial transformations to which a corresponding parent is subject, characterized in that said organizing means is operative, as appropriate, to associate two segments as parent and child by an attachment relationship, and in that the converter means, in deriving said output signals, responds to said attachment relationship by rendering the associated child segment as uncurtailed by a boundary of the corresponding parent whilst still applying to that child segment the spatial transformations to which its corresponding parent is subject.

6. A graphics output system according to claim 5, wherein said organizing means is operative to associate segments by an attachment relationship of an "above" type, said converter means responding to an above attachment relationship by rendering the associated child segment with a higher depth priority than its corresponding parent resulting in its display on top of its corresponding parent in said image where the child segment and parent overlap.

7. A graphics output system according to claim 5, wherein said organizing means is operative to associate segments by an attachment relationship of a "below" type, said converter means responding to a below attachment relationship by rendering the associated child segment with a lower depth priority than its corresponding parent resulting in its corresponding parent being displayed on top in said image where the child segment and parent overlap.

8. A graphics output system according to claim 5, wherein said organizing means is further operative to associate two segments as parent and child by a containment relationship, the converter means responding to a containment relationship by rendering the associated child segment as clipped to the boundary of, but of higher depth priority than, the corresponding parent segment.

9. A graphics output system according to claim 5, wherein said organizing means is operative to associate segments by an attachment relationship of an "above" type, said converter means responding to an above attachment relationship by rendering the associated child segment with a higher depth priority than its corresponding parent resulting in its display on top of its corresponding parent in said image where the child segment and parent overlap, said organizing means being operative to associate segments by an attachment relationship of a "below" type, said converter means responding to a below attachment relationship by rendering the associated child segment with a lower depth priority than its corresponding parent resulting in its corresponding parent being displayed on top in said image where the child segment and parent overlap, said organizing means being further operative to associate two segments as parent and child by a containment relationship, the converter means responding to a containment relationship by rendering the associated child segment as clipped to the boundary of, but of higher depth priority than, the corresponding parent segment, the converter means being operative to process said graphics segments in an order which for each parent and its children is as follows:

children associated by above attachment relationships with said parent;

the parent itself;

children associated by containment relationships with said parent; and children associated by below attachment relationships with said parent;

children having an identical relationship with the same parent being processed in the order of their relative depth priorities, and the converter means effecting its processing such that a segment being processed can only take precedence in said image over a previously processed segment where the latter is its first ancestor reached by a containment relationship when ascending the hierarchical organization of segments from said segment being processed.

10. A graphics output system according to claim 5, wherein the converter means is operative to generate a set of spans for each of a plurality of lines used to form the image by a graphics output device, the graphics output system controlling the output device by a single primitive that causes the device to draw a span of specified length, this primitive being issued as many times as necessary to build up each image line in turn.

11. A graphics output system according to claim 5, wherein the converter means is operative to locate each one of said plurality of child segments in said image in dependence on all image-related spatial transformations to which its corresponding parent is subject.

* * * * *